(No Model.)
A. J. AVERY.
PIPE COUPLING.
No. 603,721. Patented May 10, 1898.
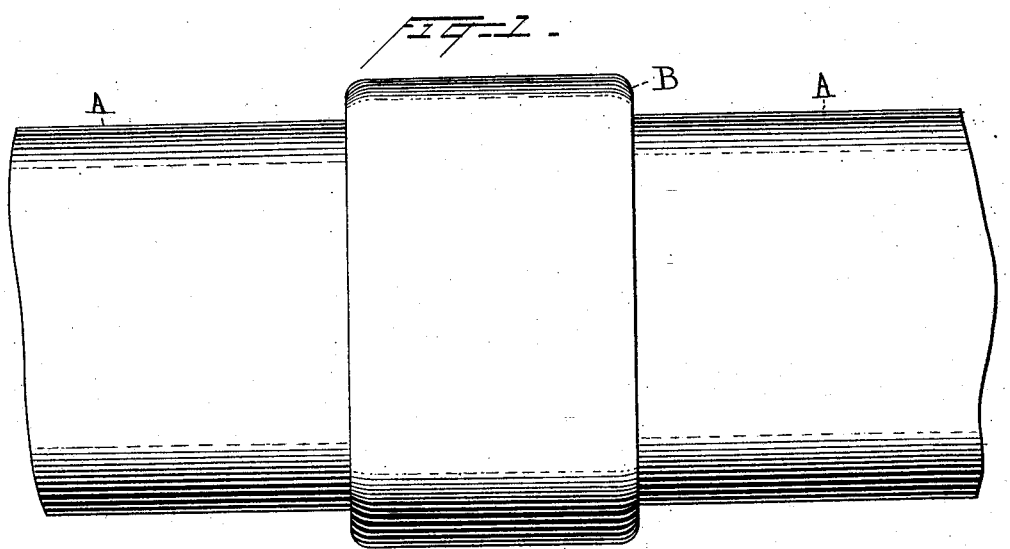
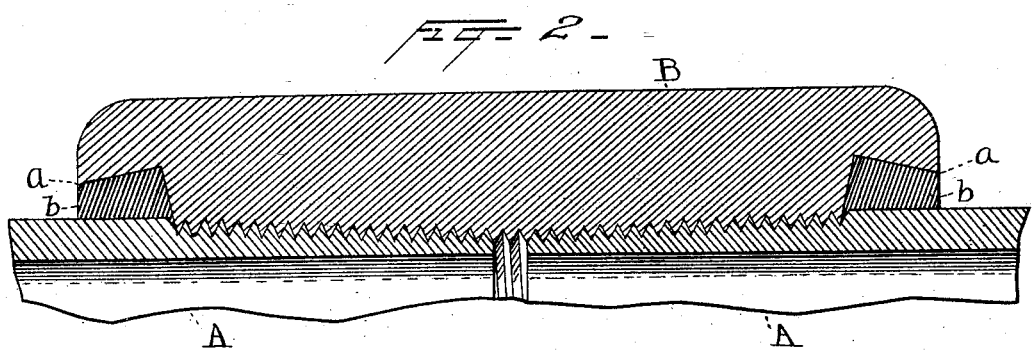
Witnesses
Norris A. Clark.
Geo. B. Crouk.
Inventor
Andrew J. Avery
By his Attorneys
Dyer & Seely.

UNITED STATES PATENT OFFICE.

ANDREW J. AVERY, OF DUNKIRK, NEW YORK.

PIPE-COUPLING.

SPECIFICATION forming part of Letters Patent No. 603,721, dated May 10, 1898.

Original application filed May 28, 1891, Serial No. 394,368. Divided and this application filed December 2, 1893. Serial No. 492,573. (No model.)

*To all whom it may concern:*

Be it known that I, ANDREW J. AVERY, a citizen of the United States, residing at Dunkirk, county of Chautauqua, and State of New York, have invented a certain new and useful Improvement in Pipe-Couplings, of which the following is a specification.

The object I have in view is to produce a pipe-coupling which will enable the transportation through pipe-lines of gas under high pressures and will also enable the employment of pipes of larger diameter than has heretofore been possible.

The invention is especially applicable to pipe-lines for natural gas, but may be employed for other purposes.

Heretofore in the conveying of natural gas to distant points a very considerable loss has been experienced by reason of leakage at the joints of the line, and this leakage of gas has also been accompanied by danger of explosion. When high pressures of three hundred pounds and upward have been employed, this leakage of gas has amounted to as high as from twenty-five to seventy per cent. daily of the cubical contents of the pipe-line. The difficulty with the joints increases not only with the pressure employed, but also with the size of the pipe, the larger the pipe the greater the difficulty in securing a tight joint. By the pipe-coupling which forms the subject of the present invention these difficulties are overcome, pressures of upward of six hundred pounds can be employed, and pipe-lines having a diameter greater than those heretofore employed become entirely practicable.

In carrying out my invention the ends of the pipe-sections are cut with a tapering screw-thread, and a surrounding collar is employed having a corresponding taper from its center to each end and provided with similar tapering screw-threads. These tapering screw-threads are made of uniform depth throughout, and the joints are screwed together until the screw-threads are firmly seated and the pipe ends are under compression. A perfect taper is provided both on the pipe ends and on the inclosing collar, so that the threads are in contact throughout.

The surrounding collar, which is, like the pipe, made of wrought-iron, is made much thicker than the collars heretofore ordinarily employed, so that under the internal pressure exerted by the gas the expansion of this collar will be very slight. So far as such pressure is concerned it may be termed a "non-expanding" collar. On the other hand, the tapering pipe ends are readily expanded by the internal gas-pressure, and this tendency to expand increases as the pipe becomes thinner toward the tapered end.

The tapered ends of the pipe where they enter the collar at the joint being under compression would expand without pressure if not held by the collar, so that when the surrounding collar expands and contracts from variations in temperature the tapered pipe ends, due both to the compression under which they are held and to the internal gas-pressure, follow the outward movements of the collar and maintain a perfect contact between the tapering threads. This action prevents the entrance of the gas between the threads, and hence prevents an equilibrium of pressures on both sides of the pipe ends. Such an equilibrium of pressures would, it is evident, withdraw the advantage due to the expanding action of the internal gas-pressure upon the pipe ends.

The surrounding collar is extended beyond the tapering threads and there provided at each end with a calking-groove, in which a metal calking is introduced. This gives an extended bearing between the collar and the pipe ends beyond the threads and prevents the breaking of the pipe ends by lateral strain.

It has been heretofore proposed to use a vanishing tapering thread in order to overcome the weakening of the pipe ends due to a thread of uniform thickness and prevent the breaking of the pipe ends by lateral strain; but by the employment of the extended bearing beyond the tapering threads I secure the strength necessary with threads of uniform depth. The calking also serves as additional security against leakage of gas. The calking-grooves are made dovetail in shape, with their bottoms oblique to the surface of the pipe. This shape assists in securing an intimate contact between the calking and the pipe and prevents the calking from being loosened except by a pressure great enough to cause the calking metal to flow. This shape of the calking-groove is one which can be readily cut in a forged collar. By employing the tapering threads of uniform depth a more secure joint is made and one which is less liable to separate under longitudinal strain.

In the accompanying drawings, forming a part hereof, Figure 1 is an elevation of the pipe-coupling; and Fig. 2 is a sectional view, on a larger scale, of one side of the coupling.

A A are the pipe ends, tapered and threaded as described.

B is the non-expanding rigid collar, internally tapered from its center outwardly toward each end and provided with tapering screw-threads corresponding to the threads on the pipe ends. The collar B is provided with dovetail calking-grooves $a$ at its ends, the bottoms of such grooves being oblique to the pipe, as shown. In the calking-grooves is a metallic calking $b$.

This application is a division of my application, Serial No. 394,368, filed May 28, 1891.

What I claim is—

1. In a pipe-coupling, the combination with the adjoining pipe-sections provided with ends tapered toward the extremity by a gradual reduction in the thickness of the pipe though not of the interior diameter thereof, said tapered part being provided with screw-threads of substantially equal depth, of a rigid non-expanding collar connecting such pipe ends and provided with screw-threads of substantially equal depth, substantially as set forth.

2. In a pipe-coupling, the combination with the adjoining pipe-sections provided with ends tapered toward the extremity by a gradual reduction in the thickness of the pipe though not of the interior diameter thereof, said tapered part being provided with screw-threads of substantially equal depth, of a rigid non-expanding collar connecting such pipe ends and tapering outwardly toward the ends by a gradual reduction in the thickness of the collar though not of its exterior diameter, the tapering ends of said collar being provided with screw-threads of substantially uniform depth, substantially as set forth.

3. In a pipe-coupling, the combination with the adjoining pipe-sections provided with ends tapered toward the extremity by a gradual reduction in the thickness of the pipe though not of the interior diameter thereof, said tapered part being provided with screw-threads of substantially equal depth, of a rigid non-expanding collar connecting such pipe ends and provided with screw-threads of substantially equal depth, and calking-grooves in the ends of the collar beyond the screw-threads, substantially as set forth.

4. In a pipe-coupling, the combination with the adjoining pipe-sections provided with ends tapered toward the extremity by a gradual reduction in the thickness of the pipe though not of the interior diameter thereof, said tapered part being provided with screw-threads of substantially equal depth, of a rigid non-expanding collar connecting such pipe ends and tapering outwardly toward the ends by a gradual reduction in the thickness of the collar though not of its exterior diameter, the tapering ends of said collar being provided with screw-threads of substantially uniform depth, and calking-grooves in the ends of the collar beyond the screw-threads, substantially as set forth.

This specification signed and witnessed this 29th day of November, 1893.

ANDREW J. AVERY.

Witnesses:
WALTER CHESTER SMITH,
CHARLES E. HEYNEMBERRY.